United States Patent [19]

Nguyen

[11] Patent Number: 5,536,363

[45] Date of Patent: Jul. 16, 1996

[54] METHODS FOR INHIBITING THE DEPOSITION OF ORGANIC CONTAMINANTS IN PULP AND PAPERMAKING SYSTEMS USING A COMPOSITION COMPRISING OF POLYVINYL ALCOHOL AND GELATIN

[75] Inventor: Duy T. Nguyen, Jacksonville, Fla.

[73] Assignee: Betz PaperChem, Inc., Jacksonville, Fla.

[21] Appl. No.: 421,349

[22] Filed: Apr. 12, 1995

[51] Int. Cl.⁶ .................................................... D21C 5/02
[52] U.S. Cl. ........................... 162/5; 162/168.1; 162/174; 162/199; 162/DIG. 4
[58] Field of Search .......................... 162/5, 168.1, 199, 162/DIG. 4, 174

[56] References Cited

U.S. PATENT DOCUMENTS

| | | | |
|---|---|---|---|
| 4,871,424 | 10/1989 | Dreisbach et al. | 162/168.1 |
| 4,886,575 | 12/1989 | Moreland | 162/5 |
| 4,956,051 | 9/1990 | Moreland | 162/199 |
| 5,474,655 | 12/1995 | Schulte et al. | 162/175 |

OTHER PUBLICATIONS

Pulp and Paper, James Casey, vol. III, 3rd ed., pp. 1587–1588.

*Primary Examiner*—Donald E. Czaja
*Assistant Examiner*—Dean T. Nguyen
*Attorney, Agent, or Firm*—Alexander D. Ricci; Philip H. Von Neida

[57] ABSTRACT

Compositions and methods for inhibiting the deposition of organic contaminants from pulp in pulp and papermaking systems are disclosed. The methods add to the pulp or to the deposition prone surface of the papermaking system a composition comprising a polyvinyl alcohol having 50 to 100% hydrolysis and a high molecular weight gelatin having a molecular weight of about 100,000 or higher.

9 Claims, 2 Drawing Sheets

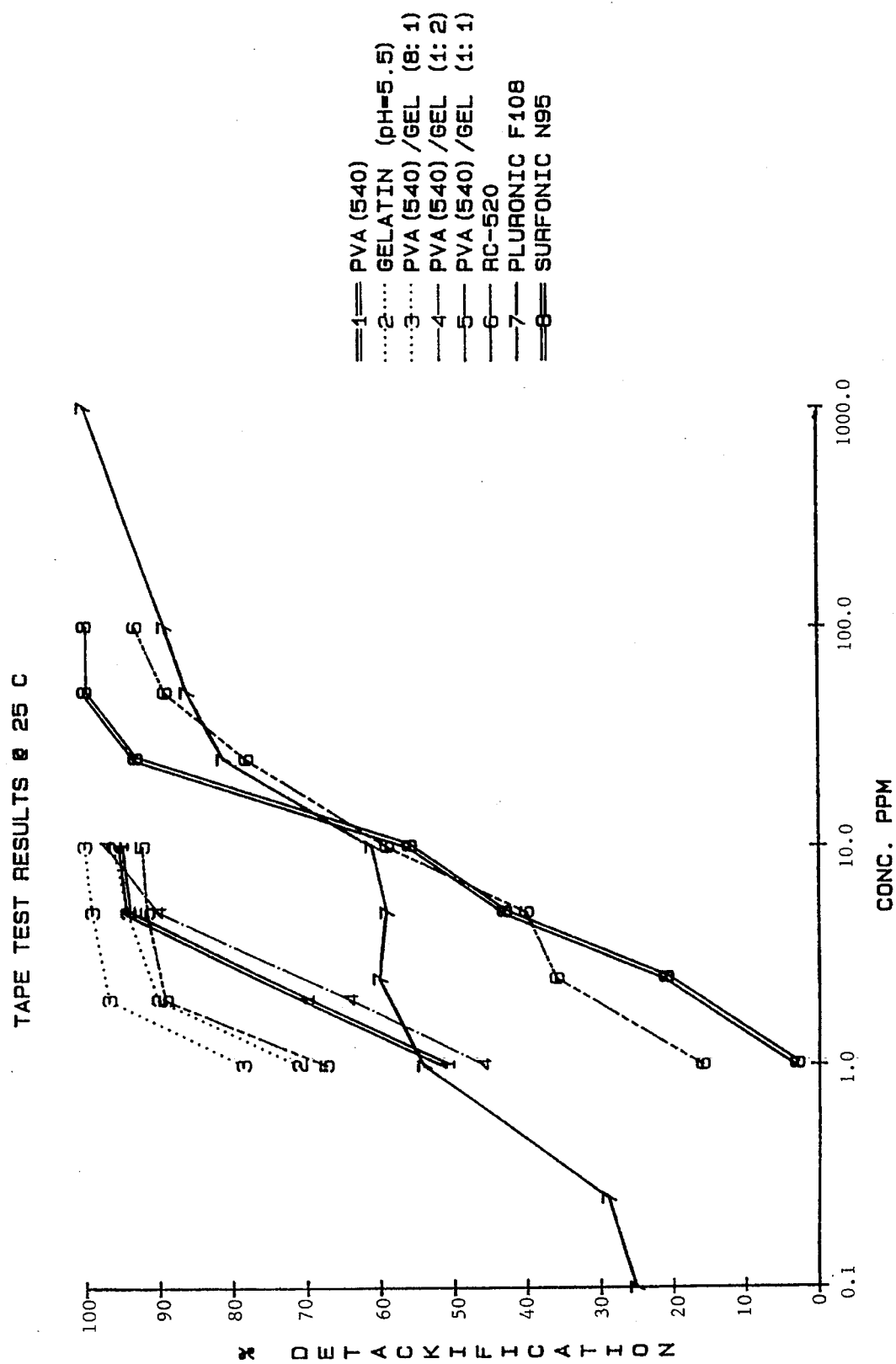

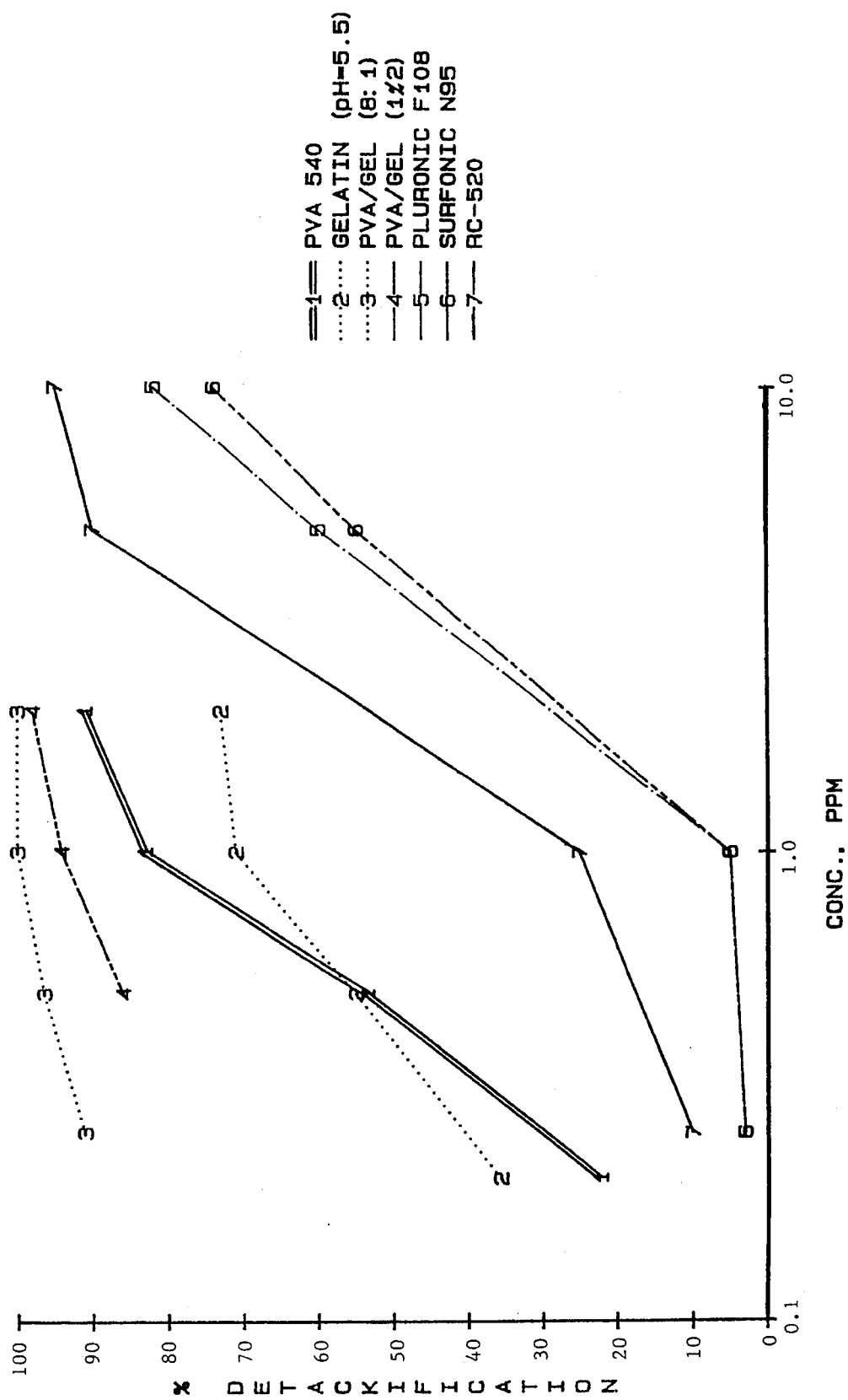

1

METHODS FOR INHIBITING THE DEPOSITION OF ORGANIC CONTAMINANTS IN PULP AND PAPERMAKING SYSTEMS USING A COMPOSITION COMPRISING OF POLYVINYL ALCOHOL AND GELATIN

FIELD OF THE INVENTION

The present invention relates to compositions and methods for inhibiting the deposition of organic contaminants in pulp and papermaking systems.

BACKGROUND OF THE INVENTION

The deposition of organic contaminants in the pulp and paper industry can cause both quality and efficiency problems in pulp and papermaking systems. Some components occur naturally in wood and are released during various pulping and papermaking processes. The term "pitch" can be used to refer to deposits composed of organic constituents which may originate from these natural resins, their salts, as well as coating binders, sizing agents, and defoaming chemicals which may be found in the pulp. In addition, pitch frequently contains inorganic components such as calcium carbonate, talc, clays, titanium and related materials.

Stickies is a term that has been increasingly used to describe deposits that occur in the systems using recycled fiber. These deposits often contain the same materials found in "pitch" deposits in addition to adhesives, hot melts, waxes, and inks. All of the aforementioned materials have many common characteristics including: hydrophobicity, deformability, tackiness, low surface energy, and the potential to cause problems with deposition, quality, and efficiency in the process. Diagram I shows the complex relationship between pitch and stickies discussed here.

DIAGRAM I

|  | Pitch | Stickies |
| --- | --- | --- |
| Natural Resins (fatty and resin acids, fatty esters, insoluble salts, sterols, etc.) | X | X |
| Defoamers (oil, EBS, silicate, silicone oils, ethoxylated compounds, etc.) | X | X |
| Sizing Agents (Rosin size, ASA, AKD, hydrolysis products, insoluble salts, etc.) | X | X |
| Coating Binders (PVAC, SBR) | X | X |
| Waxes |  | X |
| Inks |  | X |
| Hot Melts (EVA, PVAC, etc.) |  | X |
| Contact Adhesives (SBR, vinyl acrylates, polyisisoprene, etc.) |  | X |

The deposition of organic contaminants can be detrimental to the efficiency of a pulp or paper mill causing both reduced quality and reduced operating efficiency. Organic contaminants can deposit on process equipment in papermaking systems resulting in operational difficulties in the systems. The deposition of organic contaminants on consistency regulators and other instrument probes can render these components useless. Deposits on screens can reduce throughput and upset operation of the system. This deposition can occur not only on metal surfaces in the system, but also on plastic and synthetic surfaces such as machine wires, felts, foils, Uhle boxes and headbox components.

Historically, the subsets of the organic deposit problems, "pitch" and "stickies" have manifested themselves separately, differently and have been treated distinctly and separately. From a physical standpoint, "pitch" deposits have usually formed from microscopic particles of adhesive material (natural or man-made) in the stock which accumulate on papermaking or pulping equipment. These deposits can readily be found on stock chest walls, paper machine foils, Uhle boxes, paper machine wires, wet press felts, dryer felts, dryer cans, and calendar stacks. The difficulties related to these deposits included direct interference with the efficiency of the contaminated surface, therefore, reduced production, as well as holes, dirt, and other sheet defects that reduce the quality and usefulness of the paper for operations that follow like coating, converting or printing.

From a physical standpoint, "stickles" have usually been particles of visible or nearly visible size in the stock which originate from the recycled fiber. These deposits tend to accumulate on many of the same surfaces that "pitch" can be found on and causes many of the same difficulties that "pitch" can cause. The most severe "stickles" related deposits however tend to be found on paper machine wires, wet felts, dryer felts and dryer cans.

Methods of preventing the build-up of deposits on the pulp and papermill equipment and surfaces are of great importance to the industry. The paper machines could be shut down for cleaning, but ceasing operation for cleaning is undesirable because of the consequential loss of productivity, poor quality while partially contaminated and "dirt" which occurs when deposits break off and become incorporated in the sheet. Preventing deposition is thus greatly preferred where it can be effectively practiced.

In the past stickles deposits and pitch deposits have typically manifested themselves in different systems. This was true because mills usually used only virgin fiber or only recycled fiber. Often very different treatment chemicals and strategies were used to control these separate problems.

Current trends are for increased mandatory use of recycled fiber in all systems. This is resulting in a co-occurrence of stickles and pitch problems in a given mill. It is desirable to find treatment chemicals and strategies which will be highly effective at eliminating both of these problems without having to feed two or more separate chemicals. The materials of this invention have clearly shown their ability to achieve this goal.

SUMMARY OF THE INVENTION

The present invention provides for compositions and methods for inhibiting the deposition of organic contaminants from pulp in pulp and papermaking systems. The methods comprise adding to the pulp or the surfaces of the papermaking machinery a composition comprising polyvinyl alcohol and a high molecular weight gelatin.

BRIEF DESCRIPTION OF THE DRAWINGS

FIG. 1 is a graph of percent detackification at 25° C. versus dosage for various deposition control agents tested and reported in Table I below.

FIG. 2 is a graph of percent detackification at 50° C. versus dosage for various deposition control agents tested and reported in Table II below.

DESCRIPTION OF THE RELATED ART

U.S. Pat. No. 4,871,424 teaches methods for controlling pitch deposition from pulp in papermaking systems utilizing a water-soluble polyvinyl alcohol having 50% to 100% hydrolysis. U.S. Pat. No. 4,886,575 teaches a method for inhibiting the deposition and adherency of hot melt and/or pressure sensitive adhesive materials, "stickles", on the surfaces of repulping equipment using polyvinyl alcohol moieties that also contain some hydrophobic groupings, these PVA moieties having 70 to 99% hydrolysis. "Pulp and Paper", by James Casey, Vol. III, 3rd Ed., pp. 1587–1588, teaches that gelatin has been suggested as a remedy for pitch trouble.

DETAILED DESCRIPTION OF THE INVENTION

The present invention relates to compositions and methods for inhibiting the deposition of organic contaminants from pulp on the surfaces of papermaking machinery in pulp and papermaking system comprising adding to the pulp or to the surfaces of the papermaking machinery an effective deposition inhibiting amount of a composition comprising polyvinyl alcohol and a high molecular weight gelatin.

Organic contaminants include constituents which occur in the pulp (virgin, recycled or combinations thereof) having the potential to deposit and reduce paper machine performance or paper quality. This includes but is not limited to natural resins such as fatty acids, resin acids, their insoluble salts, fatty esters, sterols and other organic constituents such as ethylene bis-stearamide, waxes, sizing agents, adhesives, hot melts, inks, defoamers, and latexes which may deposit in papermaking systems.

The polyvinyl alcohol component of this invention can be derived or synthesized by polymerizing vinyl acetate to form polyvinyl acetate and alcoholysis or hydrolysis of the polyvinyl acetate to form polyvinyl alcohol. The polyvinyl alcohol can have a percent hydrolysis from about 50% to 100% with about 70% to about 100% preferred. The term "percent hydrolysis" is defined as the mole ratio of the hydroxyl groups to the starting acetate groups in the hydrolyzed polyvinyl acetate (polyvinyl alcohol) polymer multiplied by 10. Most preferably, the polyvinyl alcohol has a percent hydrolysis from about 85:5% to about 87%. It is further preferred that the polyvinyl alcohol has a molecular weight from about 15,000 to about 125,000. The polyvinyl alcohols useful in the present invention are readily commercially available. Representative polyvinyl alcohols include Airvol® 205 (MW≈25,000), Airvol® 523 (MW≈78,000) and Airvol® 540 (MW≈125,000), all available under their respective tradenames from Air Products, Inc.

The gelatin that is preferred for use in the synergistic composition has a molecular weight ranging from about 100,000 to about 250,000. Most preferably, the gelatin has a molecular weight of about 130,000. One such gelatin is commercially available from Hormel Foods under the tradename Flavorset GP-4. The term "high molecular weight gelatin" is defined as a gelatin having a molecular weight of about 100,000 or higher.

Surprisingly, it has been found that When the ingredients are mixed, in certain instances, the resulting mixtures possess a higher degree of inhibiting organic deposition than that of the individual ingredients comprising the mixture. Accordingly, it is possible to produce a highly efficacious inhibitor for use in pulp and papermaking systems. Because of the enhanced activity of the mixture, the total quantity of the deposition inhibitor treatment may be reduced. In addition, the high degree of inhibition which is provided by each of the ingredients may be exploited without use of higher concentrations of each.

The composition of polyvinyl alcohol and high molecular weight gelatin shows enhanced activity as a deposition inhibitor when employed in a PVA/gelatin weight/weight ratio of from about 1:1 to about 10:1. Superior synergistic effects are demonstrated when the weight/weight ratio is about 8:1.

The compositions of the present invention are effective at inhibiting the deposition of organic contaminants in papermaking systems. This may include Kraft, acid sulfite, mechanical pulp and recycled fiber systems. For example, deposition in the brown stock washer, screen room and decker system in Kraft papermaking processes can be inhibited. The term "papermaking systems" is meant to include all pulp processes. Generally, it is thought that these compositions can be utilized to inhibit deposition on all surfaces of the papermaking system from the pulp mill to the reel of the paper machine having a pH from about 3 to 11 and under a variety of system conditions. More specifically, the compositions effectively decrease the deposition not only on metal surfaces but also on plastic and synthetic surfaces such as machine wires, felts, foils, Uhle boxes, rolls and headbox components.

The compositions of the present invention may be compatible with other pulp and papermaking additives. These can include starches, titanium dioxide, defoamers, wet strength resins, and sizing aids.

The compositions of the present invention can be added to the papermaking system at any stage. They may be added directly to the pulp furnish or indirectly to the furnish through the headbox. The inventive compositions may also be sprayed onto surfaces that are suffering from deposition, such as the wire, press felts, press rolls and other deposition-prone surfaces.

The compositions of the present invention can be added to the papermaking system neat, as a powder, slurry or in solution; the preferred primary solvent being water but is not limited to such. When added by spraying techniques, the inventive composition is preferably diluted with water to a satisfactory inhibitor concentration. The inventive compositions may be added specifically and only to a furnish identified as contaminated or may be added to blended pulps. The compositions may be added to the stock at any point prior to the manifestation of the deposition problem and at more than one site when more than one deposition site occurs. Combinations of the above additive methods may also be employed by feeding either the polyvinyl alcohol or high molecular weight gelatin separately, by way of feeding the pulp millstock, feeding to the paper machine furnish, and spraying on the wire and the felt simultaneously.

The effective amount of the composition to be added to the papermaking system depends on a number of variables including the pH of the system, hardness of the water, temperature of the water, additional additives, and the organic contaminant type and content of the pulp. Generally, from 0.5 parts to about 150 parts of the inventive composition per million parts of pulp is added to the papermaking system. Preferably, from about 2 parts to about 100 parts of the inventive composition are added per million parts of pulp in the system.

There are several advantages associated with the present invention as compared to prior processes. These advantages include an ability to function without being greatly affected by hardness of the water in the system; an ability to function while not adversely affecting sizing and fines retention; an ability to function at very low dosages; reduced environmental impact; and improved biodegradability.

Further, these compositions have proven effective against both the pitch and stickies manifestation of organic deposition problems providing for an effective reduction of these problems in paper mills utilizing a variety of virgin and recycled fiber sources.

The data set forth below were developed to demonstrate the unexpected results occasioned by use of the present invention. The following examples are included as being illustrations of the invention and should not be construed as limiting the scope thereof.

EXAMPLES

Standard Tape Detackification Test

In order to establish the efficacy of the inventive composition as deposition control agents on plastic surfaces and specifically for adhesive contaminants of the sort found in recycled pulp, a laboratory test was developed utilizing adhesive-backed tapes as stickle coupons. The stickle coupon can be fabricated from any type of adhesive tape that will not disintegrate when placed in water. For this study, tapes made from a styrenebutadiene rubber and vinylic esters were used. Both of these potential organic contaminants are known to cause stickles problems in secondary fiber utilization. A second coupon was fabricated from polyester film such as MYLAR®, a product marketed by the DuPont Chemical Company. This material was chosen because paper machine forming fabrics are frequently made of polyester which is susceptible to considerable deposition problems caused by stickles and/or pitch.

This test involved immersing a 2"×4" adhesive tape and a 2"×4" polyester Mylar coupon into a 600 gram solution being tested. The solution contained in a 600 mL beaker is placed in a water bath with agitation and heated to the desired temperature. After 30 minutes of immersion, the tape and coupon are removed from the solution and pressed to 10,000 lb force for one minute. A tensile test instrument (Instron) is then used to measure the force required to pull the two apart. A reduction in the force required indicates that the "stickle" has been detackified. The % control or detackification is calculated by the following equation:

$$\% \text{ detackification} = \frac{(\text{untreated force} - \text{treated force})}{\text{untreated force}} \times 100$$

The results of this testing are presented in Tables 1 and II.

TABLE I

Standard Tape Detackification Test at 25° C.

| Example No. | Dosage (ppm) | % Detackification |
|---|---|---|
| 1 | 1 | 78.5 |
|   | 2 | 96.7 |
|   | 5 | 99 |
|   | 10 | 100 |
| 2 | 1 | 46 |
|   | 2 | 64 |
|   | 5 | 90 |
|   | 10 | 97 |
| 3 | 1 | 67.3 |
|   | 2 | 89.1 |
|   | 5 | 91.5 |
|   | 10 | 92.1 |
| 4 | 1 | 51 |
|   | 2 | 70 |
|   | 5 | 94 |
|   | 10 | 95 |
| 5 | 1 | 71 |
|   | 2 | 90 |
|   | 5 | 94.1 |
|   | 10 | 96 |

TABLE I-continued

Standard Tape Detackification Test at 25° C.

| Example No. | Dosage (ppm) | % Detackification |
|---|---|---|
| 6 | 1 | 3 |
|   | 2.5 | 21 |
|   | 5 | 43 |
|   | 10 | 56 |
|   | 25 | 93 |
|   | 50 | 100 |
|   | 100 | 100 |
| 7 | 0.1 | 25 |
|   | 0.25 | 29 |
|   | 1 | 54 |
|   | 2.5 | 60 |
|   | 5 | 59 |
|   | 10 | 61 |
|   | 25 | 81 |
|   | 50 | 86 |
|   | 100 | 89 |
|   | 1000 | 100 |
| 8 | 1 | 16 |
|   | 2.5 | 36 |
|   | 5 | 40 |
|   | 10 | 59 |
|   | 25 | 78 |
|   | 50 | 89 |
|   | 100 | 93 |

TABLE II

Standard Tape Detackification Test at 50° C.

| Example No. | Dosage (ppm) | % Detackification |
|---|---|---|
| 1 | 0.25 | 91 |
|   | 0.5 | 96.4 |
|   | 1 | 100 |
|   | 2 | 100 |
| 2 | 0.25 | 86 |
|   | 1 | 94 |
|   | 5 | 98 |
| 4 | 0.2 | 22.3 |
|   | 0.5 | 53.6 |
|   | 1 | 83 |
|   | 2 | 91 |
| 5 | 0.25 | 35.7 |
|   | 0.5 | 55 |
|   | 1 | 71 |
|   | 2 | 73 |
| 6 | 0.25 | 3 |
|   | 1 | 5 |
|   | 5 | 55 |
|   | 10 | 74 |
|   | 25 | 97 |
| 7 | 0.25 | 3 |
|   | 1 | 5 |
|   | 5 | 60 |
|   | 10 | 82 |
|   | 25 | 96 |
| 8 | 0.25 | 10 |
|   | 1 | 25 |
|   | 5 | 90 |
|   | 10 | 95 |
|   | 25 | 97 |

Example 1 is 8:1 w/w ratio of Airvol 540:HMW gelatin
Example 2 is 1:2 w/w ratio of Airvol 540:HMW gelatin
Example 3 is 1:1 w/w ratio of Airvol 540:HMW gelatin
Example 4 is Airvol ® 540
Example 5 is HMW gelatin
Example 6 is Surfonic ® N-95
Example 7 is Pluronice ® F-108
Example 8 is Igepale ® RC-520
Airvol ® 540 is polyvinyl alcohol (MW ≅ 125,000), available from Air Products, Inc. (85.5–87% hydrolyzed)
HMW gelatin ≈ 100,000 molecular weight

TABLE II-continued

Standard Tape Detackification Test at 50° C.

| Example No. | Dosage (ppm) | % Detackification |
|---|---|---|

Surfonic ® N-95 is a nonyl phenol ethoxylated surfactant, available from Texaco
Pluronic ® F-108 is a block copolymer polyoxyalkylene derivative of propylene glycol, available from BASF Wyandotte, Inc.
Igepal ® RC-520 is an alkylphenoxypoly(oxyethylene)ethanol, available from GAF, Inc.

These results indicate that the inventive composition of 8:1 PVA/gelatin exhibited pronounced synergistic effects while the composition in ratios of 1:2 and 1:1 also demonstrated synergism. These results further indicate that polyvinyl alcohol (U.S. Pat. Nos. 4,871,424 and 4,886,575) and high molecular weight gelatin (Pulp and Paper, Vol. III, p. 1588) were less effective at detackification than the invention composition. The inventive composition also proved more effective than the traditional pitch/stickles control agents, Examples 6, 7 and 8.

Contact angle measurements were also performed utilizing the inventive composition. The MYLAR or tape adhesive surface is clamped on a film stage and placed inside the glass test cell. The test solution is added to the cell by carefully pouring 15 mL of the solution into the cell. The whole test cell was then placed inside the chamber of a goniometer (Kruss G1 ). The MYLAR or tape adhesive surface was immersed in the solution for 30 minutes to simulate the contact time as in the standard tape detackification test. Contact angle provides information about the hydrophobicity of a simulated stickles surface and the change in the hydrophobicity as surface-active materials are adsorbed and/or desorbed at the surface. If the contact angle of the treated solution is lower than that of the untreated, this indicates that the surface becomes more hydrophilic or less stickle. The results of this testing are reported in Tables III and IV.

TABLE III

Contact Angle Measurements at 25° C.

| Material | Dosage (ppm) | Surface | Contact Angle |
|---|---|---|---|
| Water | — | MYLAR | 58 |
|  | — | tape | 81 |
| P1500 | 2 | tape | 65 |
|  | 5 | tape | 47 |
|  | 5 | MYLAR | 48 |
| Peptein 2000 | 2.5 | MYLAR | 49 |
| Meat soluble protein | 2 | tape | 46 |
| Protein | 2 | MYLAR | 46 |
|  | 5 | MYLAR | 49 |
|  | 5 | tape | 39 |
| Gelatin (high MW) | 2.5 | MYLAR | 37 |
|  | 2.5 | tape | 41 |
| Airvol ® 540 | 2.5 | MYLAR | 45 |
|  | 2.5 | tape | 54 |
| Airvol ® 540/high MW | 2.5 | MYLAR | 32 |
| Gelatin (8:1) | 2.5 | tape | 34 |

P1500 is a low molecular weight gelatin (MW ≈ 1500–5000)
Peptein 2000 is a low molecular weight gelatin (MW ≈ 1500–5000)
Airvol ® 540 is polyvinyl alcohol, available from Air Products, Inc.

TABLE IV

Contact Angle Measurements at 50° C.

| Material | Dosage (ppm) | Surface | Contact Angle |
|---|---|---|---|
| Surfonic ® N-95 | 5 | MYLAR | 48 |
| Pluronic ® F-108 DTN | 5 | MYLAR | 50 |
| High M.W. gelatin | 2.5 | MYLAR | 34 |
| Airvol ® 540 | 2.5 | MYLAR | 24 |
|  | 0.5 | MYLAR | 41 |
| Airvol ® 540/high MW | 2.5 | MYLAR | 20 |
| Gelatin (8:1) | 0.5 | MYLAR | 25 |

The results presented in Tables III and IV demonstrate that the inventive compositions exhibit a much lower contact angle than the conventional pitch/stickies control agents and polyvinyl alcohol and high molecular weight gelatin when each are employed individually. Furthermore, the low molecular weight gelatin and meat soluble protein also proved less effective than the inventive composition.

It is well known that surface-active materials tend to form aggregates at the Critical Micelle Concentration (CMC). The CMC can be estimated from the break observed in the surface tension-concentration semi-log plot. No CMC was observed for the high molecular weight gelatin for the concentrations studied (i.e., 0.5 ppm to 100 ppm). The CMC is expected to be higher than 100 ppm. A CMC of 10 ppm was obtained for the Airvol® 540. The 8:1 ratio of PVA/high molecular weight gelatin exhibited a very low CMC of 2 ppm which is indicative of a synergistic mixture.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for inhibiting the deposition of organic contaminants from pulp in pulp and papermaking systems comprising adding to said pulp an amount, ranging from 0.5 parts to about 150 parts per million parts pulp, of a composition comprising a polyvinyl alcohol having from 50 to 100% hydrolysis and a high molecular weight gelatin; wherein the ratio of polyvinyl alcohol to gelatin is 8:1 weight/weight percent, said polyvinyl alcohol has a molecular weight ranging from about 15,000 to about 125,000 and said gelatin has amolecular weight range of about 100,000 to about 250,000.

2. The method as claimed in claim 1 wherein said polyvinyl alcohol has 85.5 to 87% hydrolysis.

3. The method as claimed in claim 1 wherein said organic contaminants are stickles deposits.

4. The methods as claimed in claim 1 wherein said organic contaminants are pitch deposits.

5. A method for inhibiting the deposition of organic contaminants from pulp on the surfaces of papermaking machinery and equipment in pulp and papermaking systems comprising spraying onto said surfaces an amount, ranging from 0.5 parts to about 150 parts per million parts pulp, of a composition comprising a polyvinyl alcohol having from 50 to 100% hydrolysis and a high molecular weight gelatin;

wherein the ratio of polyvinyl alcohol to gelatin is 8:1 weight/weight percent, said polyvinyl alcohol has a molecular weight ranging from about 15,000 to about 125,000 and said gelatin has a molecular weight range of about 100,000 to about 250.000.

6. The method as claimed in claim 5 wherein said polyvinyl alcohol has 85.5 to 87% hydrolysis.

7. The method as claimed in claim 5 wherein said organic contaminants are stickles deposits.

8. The method as claimed in claim 5 wherein said organic contaminants are pitch deposits.

9. The method as claimed in claim 5 wherein said surfaces are selected from the group consisting of the wire, press felts, and press rolls.

* * * * *